United States Patent
Boardman et al.

(10) Patent No.: US 6,560,721 B1
(45) Date of Patent: May 6, 2003

(54) TESTCASE SELECTION BY THE EXCLUSION OF DISAPPROVED, NON-TESTED AND DEFECT TESTCASES

(75) Inventors: Trevor John Boardman, Chandlers Ford (GB); Kal Christian Steph, Wolfenbuettel (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/558,719

(22) Filed: Apr. 26, 2000

(30) Foreign Application Priority Data

Aug. 21, 1999 (GB) ............................. 9919774

(51) Int. Cl.⁷ .............................. G06F 9/44
(52) U.S. Cl. ........................... 714/33; 714/32
(58) Field of Search ............... 714/25, 26, 32, 714/33, 37, 38

(56) References Cited

U.S. PATENT DOCUMENTS

| | | | | |
|---|---|---|---|---|
| 5,195,095 A | * | 3/1993 | Shah ........................... | 714/26 |
| 5,421,006 A | * | 5/1995 | Jablon et al. ................. | 714/36 |
| 5,542,043 A | | 7/1996 | Cohen et al. | |
| 5,629,878 A | * | 5/1997 | Kobrosly .................... | 702/120 |
| 5,758,061 A | * | 5/1998 | Plum ........................... | 714/35 |
| 5,812,436 A | | 9/1998 | Desgrousilliers et al. | |
| 5,896,494 A | | 4/1999 | Perugini et al. | |
| 5,983,364 A | * | 11/1999 | Bortcosh et al. .............. | 714/25 |
| 6,088,690 A | * | 7/2000 | Gounares et al. ............. | 706/13 |
| 6,182,245 B1 | * | 1/2001 | Akin et al. .................... | 714/38 |
| 6,367,041 B1 | * | 4/2002 | Statovici et al. ............ | 714/724 |
| 6,415,396 B1 | * | 7/2002 | Singh et al. .................. | 714/38 |
| 6,421,822 B1 | * | 7/2002 | Pavela ........................ | 717/125 |

OTHER PUBLICATIONS

"Measuring Completeness of a Test Case Library", IBM Technical Disclosure Bulletin, Feb. 1981, US, vol. 23, iss. 9, pp. 3972–3973.*

Jalote et al., "Automated Testcase Generation for Data Abstraction", Computer Software and Applications Conference, 1988, COMPSAC 88. Proceedings., Twelfth International, 1988, pp. 205–210.*

Huang, "An Approach to Program Testing", Sep. 1975, ACM Computing Surveys, ACM Press New York, NY, USA, vol. 7, Issue 3, pp. 113–128.*

Friedman et al., "Projected State Machine Coverage for Software Testing", 2002, Proceedings of the international symposium o Software testing and analysis, ACM Press New York, NY, USA, pp. 134–143.*

* cited by examiner

Primary Examiner—Robert Beausoliel
Assistant Examiner—Gabriel Chu
(74) Attorney, Agent, or Firm—Louis J. Percello; F. Chau & Associates, LLP (57) ABSTRACT

A testcase management system comprises a test suite including a plurality of testcases, wherein these testcases are cooperable with a test harness for executing a test run in which at least one of the testcases is executed on a system to be tested. A method and apparatus are provided for generating a list (overall list) indicative of the testcases that are to be executed during the test run. The overall list is generated as follows: A list is generated of all testcases in the test suite. Some of these testcases will have been fully tested in all environments and be verified as approved. They are manually added to an approved list. Others are disapproved and are manually added to a disapproved list. A list is automatically generated comprising those testcases which are neither approved nor disapproved. They are not-tested. Those testcases on the disapproved and not-tested lists are excluded from the overall list. Some of the testcases correspond to defects in the system to be tested which have not yet been fixed. These are added to a defect list and the testcases in this list are also excluded from the overall list.

20 Claims, 4 Drawing Sheets

TESTCASE SELECTION BY THE EXCLUSION OF DISAPPROVED, NON-TESTED AND DEFECT TESTCASES

FIELD OF THE INVENTION

The present invention relates to the field of testing and more particularly that of testcase management.

DESCRIPTION OF THE RELATED ART

It is vital to ensure that a product or system is fully operational and consistently performs according to its functional specification before it is made available to the public. The reliability of computer hardware/software is especially important since computers form the backbone of an increasingly large number of organisations. When a computer system fails to respond as intended, businesses are invariably unable to provide even the most basic of services. Money, reputation or even lives may be lost, dependant upon the criticality of the service, the outage time etc.

In today's increasingly competitive market-place, quality and reliability are of the utmost importance. Customers do not tolerate mistakes and the later a defect is discovered, the more costly it can prove to the manufacturer. Exhaustive testing is impractical, if not impossible, but what is important however is that a computer system is subjected to as many operational scenarios as is feasible. Any resulting problems can then be corrected before the system is released.

Typically, these operational scenarios may be simulated using a large number of small computer programs known as testcases. Each testcase, within an overall test suite, is designed to test a different aspect of the system. A test harness is used to run the suite of testcases as well as performing other tasks such as finding testcases in a directory tree and producing a report describing which testcases passed and which ones failed.

A test run may comprise a thousand or more testcases and if the testcases themselves cannot be relied upon, all failures have to be analyzed to determine whether or not the reported fault actually exists. This investigation greatly increases the time taken before the true defects in the system under test get reported to the developers and ultimately before a fix can be engineered.

During the test phase of a computer software system, it is quite usual for the test suite itself to be in a dynamic state of change. New testcases will be created, whilst old ones are altered. The writing and testing stages thus typically operate in parallel with one another.

This approach is particularly advantageous since it means that the testcase writers no longer have to assimilate full knowledge about all aspects of the computer system before creating the whole suite of cases. Instead they may apply the experience that they gain with time and use the feedback received from the testers themselves to ensure the thoroughness and applicability of their work.

Another advantage, is that testcases may be written by a variety of different people with varying amounts of time and ability to devote. By running the two phases in parallel, it is possible to start with a small selection of tests and to add to them as and when the relevant personnel become available. Thus time is not wasted waiting for a testcase writer to finish another project or return from sick leave, holiday etc.

Furthermore, during the development of a product, it is extremely likely that a customer's requirements will alter somewhat. It is important to be able to adapt to the resulting specification changes during the test phase. This too is made a great deal easier by running both phases simultaneously.

All of the above should culminate in a much more efficient modus operandi. Ultimately, the time taken to get the system to the market-place should be greatly reduced. The customers are kept happy and the system can start recouping the investment placed in it.

Despite the merits of a continually changing and adapting suite of testcases, there are however a number of associated problems:

i) New testcases often contain defects and as a result, they may omit to detect a current flaw in the aspect of the system under test (false positive). Alternatively, the testcase may report a non-existent fault (false negative).

ii) Some testcases are interactive, providing the tester with a variety of instructions. These may ask the tester to perform a particular operation and also list the appropriate pass/fail criteria. For example, the tester may be told to activate a popup menu and informed that this should contain three menu-items. Both the task instructions and the pass/fail criteria are frequently incomplete or difficult to interpret. This is usually because the testcase writer does not know who will run the testcase or the amount of knowledge that person has. Furthermore, an instruction that is obvious to the testcase writer may not be so easy for others to decipher.

iii) Further problems can occur if the environment under which the testcase was developed differs from that in which the testcase is being run. A testcase created under a particular operating system, for instance, may rely upon a feature of that operating system which is not universally available. An example of this is the "vmstat" command which reports virtual memory statistics on UNIX based systems, but has no meaning elsewhere. A testcase incorporating such a command would in all likelihood fail if executed on, for example, a Windows NT system. Furthermore, certain testcases are required not to be run when a feature they test or use is not installed or activated.

iv) A testcase may also fail if the environment in which it is executed is not configured in a particular way. It may rely upon certain resource restrictions and require, for example, that the amount of free memory is below a pre-determined level. Any other memory setting may cause the testcase to abnormally end.

v) Furthermore a testcase may provoke a failure in the test harness. A failure in the harness itself will prevent the bona fide testcases from being run and delay the test phase.

Such failures cause testers many hours of painstaking investigative work and can severely hold up proceedings. It is important for testers to be able to rely upon the testcases themselves and to be sure that any failures are as a result of true defects in the system under test.

There are a number of additional reasons for not running a particular testcase:

i) During the development lifecycle, it is quite common to defer the fixing of a defect in the system under test until a future version. Testing for that defect in an earlier version will naturally also cause the associated testcase to fail. Testers testing the current version of the system do not want to keep running testcases which show up these deferred defects.

ii) It is also common for different teams to be testing different versions of the system at the same time. These teams will want to run different versions of the test suite which contain a set of tests appropriate to the version they are testing.

iii) During the development of a system, at any one time, a number of system defects may have been reported to the development team but have not yet been fixed. Information regarding each defect is stored as a defect record. Each record contains a status field which will have a value of 'open', 'working', 'verify' or 'closed'. 'Open' means that the defect has been reported to development but they have not yet started work on it. 'Working' means that the development team are working on the defect. 'Verify' means that development have applied a fix for the defect and they require the test team to verify the fix is good by re-running the testcase. 'Closed' means that the test team have verified that the fix is good. System defects will move between the four states whilst the development activity is in progress. Testcases are re-run on a regular basis and there is little point in re-running testcases which provoke defects whose status is 'open' or 'working' because known failures would keep re-occurring and this would tend to swamp the new failures.

Testers do not want to be concerned with those testcases which will fail for any reason, other than that there is a real problem with the system under test. It is vital, therefore, for them to be able to effectively manage the testing phase by executing only those testcases which are applicable to the current set of circumstances. They must be able to exclude any rogue/problematic testcases.

A number of attempts have been made to enable this. It is possible to avoid such failures by unhooking the bona fide testcase(s) from the suite and running them in an isolated fashion. This however is a cumbersome and time-consuming approach. Furthermore, the tester has to be aware of the current status for all testcases in order to make an informed decision. Since suites will typically be added to in an ad hoc fashion by a number of different people, this is just not feasible.

Another alternative is to categorise the testcases by inserting a keyword or phrase into each. The tester is then able to instruct the test harness to run only those tests which contain keywords from a given list. For example, a set of testcases could include the keyword "Runable", whilst another set includes the key phrase "System Defect not fixed". Such a procedure however requires modification to the testcase itself and thus there is scope for the introduction of errors.

Another approach requires the maintenance of several test suites, one for each system version/feature set. Testcases found to be defective or those relating to defects not fixed/ fixed in a later version are disabled. This has the disadvantage that many testcases will be present in more than one test suite and this will consume more disk space. Additionally, if a modification is made to a testcase then all the copies in the other test suites must be located and updated. This consumes a great deal of time and is very prone to error. This method also requires the maintenance of a list of disabled testcases so that the testcase writers know which ones need fixing.

Configuration Management Version Control product (CMVC) from the IBM Corporation is a system which is used to control changes to any software system which is made up from a large number of source files. It allows the tracking of defects in the system being developed as well as any proposed changes to the system. It permits any updates or modifications to be properly controlled and allows these to be undone should their effect be undesirable. CMVC is intended to manage a large number of inter-related files to build a software system. It has no features useful to someone who wants to effectively manage the exclusion of defective or unapplicable testcases. However, CMVC files are a useful way to store testcases because of the automatic backup and early version recall features.

Test Tracking Tool (TTT) from the IBM Corporation comprises a set of Lotus Notes databases which enable the management of data associated with the testing phase of a project. The tool aids testcase definition, test preparation and test execution. Multiple testcases may be assigned a status of "blocked" and thus excluded during the test phase. However, such a method of excluding testcases only operates within the TTT environment. It is not portable to other systems.

It is possible to categorise the testcases using a library system. A plurality of folders may be created with a meaningful heading assigned to each. Such headings could include: "faulty testcases", "system defect fixed in version 1.1", "system defect not fixed", "Tunable testcases" etc. Each testcase is then placed in the relevant directory, with certain directories being excluded during the test run according to the system under test.

During the test phase however, testcases will need to swap directories as and when their status changes. For example, once a bug has been fixed in testcase A, that testcase will have to be moved from the "faulty testcases" category to the "runable testcases" category. Testcases will therefore be continually on the move. When a suite of testcases is executed, the test harness has to be provided with a path indicating where the testcases themselves sit. With a library system of categorisation, this path would be continually changing and this would prove extremely confusing for the testers.

Batch Environment Random Driver 1.0 (BERD) from the IBM Corporation is a workload generator which creates a batch workload by randomly or sequentially submitting jobs from user specified libraries at a user specified rate. Tying this into the present context, batch jobs can be thought of as testcases. The tool also supports an exclusion list which enables the identification of jobs or testcases which are not to be submitted. This is an improvement on the library system since the testcases do not need to move folders according to their current status. Instead, a single entry is made on, or removed from the exclusion list. This is a much simpler way of managing testcases. However, there may be multiple reasons for excluding a testcase as explained above and testers need to be able to track this effectively. BERD does not provide this additional level of functionality/ flexibility.

SUMMARY OF THE INVENTION

According to the preferred embodiment, multiple lists defining different categories of testcases which may be excluded during a test run and a program to stop those testcases in the lists from running are utilised. Different testers can choose to exclude different tests, causing different combinations of the lists to form an overall list, thus including only the tests appropriate to the system being tested. For this reason, more than one copy of the overall list may exist, with each copy being appropriate to a different set of circumstances. It should be seen that the overall list can either be a list of cases which are to be excluded or it may be the converse including only cases which are to be used in a test run.

The multiple lists can also be used to ensure that only testcases which have been fully tested in all environments are run. This means that time is not wasted by testers investigating problems generated by rogue testcases or testcases with inadequate instructions. Testers are periodically notified if one of their testcases is rogue and they can then repair it. This notification may be manual, by e-mail or some other means. Testcases which have not been tested may also be excluded until verified. A testcase may be excluded for more than one reason. The multiple lists can also be used to mitigate the effects of faults in a testcase harness.

Furthermore, the multiple lists can be used to control which testcases are run depending on the development state of the system under test. For example, there is little point in executing testcases relating to known system defects since these will fail. The multiple lists are also used to control the development of testcases and prevent testers wasting time running testcases for system defects which have not yet been fixed or which have been fixed in a later version of the system under test.

System defects may only have been fixed in the version of the system under test for a particular operating system. It is also possible using the invention to ensure that testcases relating to these system defects are not run.

Multiple lists allow testers to effectively categorise the testcases. The testcases themselves are left untouched meaning that inadvertent errors are not introduced. Whenever a testcase changes category (eg moves from a "faulty testcases" category to a "runable testcases" category) only an entry on one of the lists needs be changed. There is no longer any need to maintain a different test suite for each environment/set of circumstances. Rather the lists identify which testcases within the overall suite to run. Testcases remain in one place and thus the path that must be provided to the testcase harness to tell it where to find its testcases does not keep changing. In this way, confusion is avoided. This method of excluding testcases is also portable. It does not rely upon a specific testing environment.

BRIEF DESCRIPTION OF THE DRAWINGS

A preferred embodiment of the present invention will now be described in detail, by way of example only, with reference to the following drawings.

DETAILED DESCRIPTION

Figure 1:
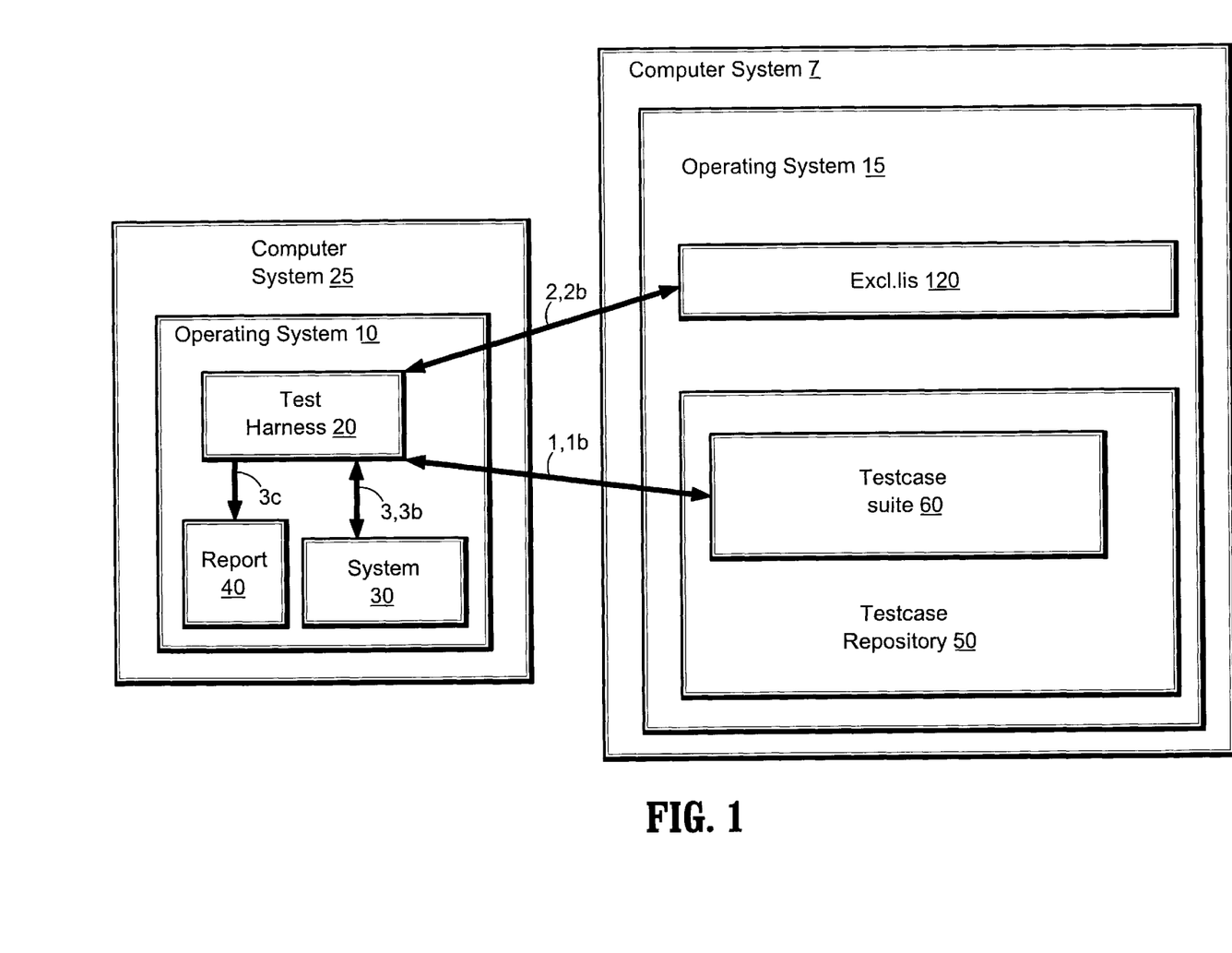
FIG. 1 illustrates a schematic diagram of the operation of the test harness according to a preferred embodiment of the present invention.

With reference to FIG. 1, a computer system 25 runs an operating system 10. According to the preferred embodiment, the computer system is from the IBM RISC System/6000 family and runs in conjunction with the IBM AIX operating system. A test harness 20 runs on top of the operating system and is responsible for executing a sequence of tests on system 30, which also runs on top of the operating system 10.

A second computer system 7 runs an operating system 15 which in the present case is also AIX. According to the preferred embodiment, the second computer is also from the IBM RISC System/6000 family. Within the operating system resides a testcase repository 50 in which a suite of testcases 60 are stored within a DB2 database, available from the IBM Corporation. The invention is not limited to a DB2 database and the suite may comprise another database product (eg Oracle) or none at all. The repository itself comprises the CMVC product. According to an alternative preferred embodiment the repository comprises the Polytron Version Control System (PVCS) from Intersolv.

According to the preferred embodiment, the system under test 30 is the Java Virtual Machine (JVM). This is a self-contained operating system in which a java program may run whilst being kept totally separate from the underlying hardware/software. Appendix A provides an example testcase which checks array handling in the JVM. If it produces an exception then the test has failed, otherwise it has passed.

According to the preferred embodiment, also stored within the operating system is a flat text file, Excl.lis 120, comprising a list of testcases which are not to be tested on system 30 (they are to be excluded). In the preferred embodiment, the testcases may be excluded for any one of the reasons cited in the introduction.

The test harness takes three parameters as input:
i) The file path to the system under test 30;
ii) The file path to the testcases to be executed on system 30; and
iii) The file path to the exclusion list.

The test harness communicates with the second computer system 7 (arrow 1) in order to request the suite of testcases 60 to execute on system 30. These are returned via arrow 1b. The test harness also requests the exclusion list via arrow 2 and receives it via arrow 2b.

The test harness uses the exclusion list to determine which of the tests received from the repository not to execute on system 30. The test harness compares the list of testcase names contained within excl.lis 120 to determine which ones match the testcases contained within the testcase suite. Those that match are disregarded, whilst the rest are tested on the system 30 (arrow 3). In addition to holding information regarding those testcases which are to be excluded, the list 120 also contains information about why each individual test is excluded.

According to the preferred embodiment, some of the testcases are interactive and for each of these, a user is required to complete some task in order to verify that a particular aspect of the system is functioning correctly. Other testcases run automatically without intervention. The interactive testcases are executed separately from the automatic testcases. In an alternative preferred embodiment, both the interactive and automatic testcases are executed during the same test run.

Status information is returned automatically to the test harness as each test is completed via arrow 3b and once all tests have been completed, the test harness uses this to generate a number of reports 40 (one shown) (arrow 3c). Preferably, the following reports are created:
i) A report indicating those tests which passed; and
ii) A report indicating those tests which failed;

Appendix B shows an example of a "passed" report. For each testcase where the execution was successful, it includes the path name to that case and a comment regarding the aspect of the system being tested by that testcase. Appendix C gives an example of a "failure" report. A general message is provided informing that the execution of a particular testcase did not run to completion and that an exception was raised. This message also includes a reason for the failure (eg inset function returned different values). The report then includes the path to the failed testcase and a comment explaining what that testcase was testing for. This information can then be used by the developers in order to investigate the problem further and ultimately in fixing the system. Note, in both examples those testcases contained in the regular directory require no user intervention, they are automatic.

Figure 2A:
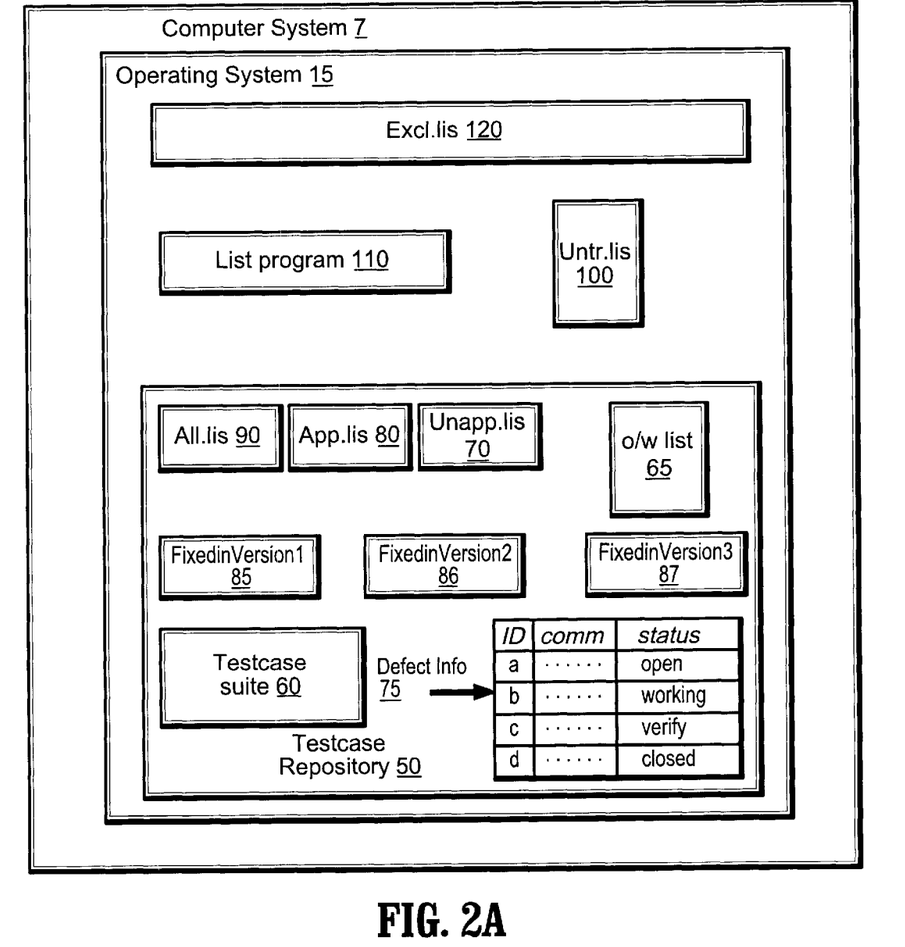
FIG. 2A is a block diagram illustrating the components used to create the exclusion list of FIG. 1 according to a preferred embodiment of the present invention.

FIG. 2A is a block diagram illustrating the components used to create the exclusion list of FIG. 1 according to a preferred embodiment of the present invention. In addition to the testcase suite 60, the testcase repository 50 further comprises a plurality of flat text files 90, 80, 70. All.lis 90 contains a list of all the testcases which sit within the testcase suite. This is automatically generated by a list program 110, which resides within the operating system 15, but outside the testcase repository. All.lis contains not only the name of each testcase but the path where it is located. This is because the testcases are stored within a directory structure in the testcase suite.

The other two flat files, App.lis 80 and Unapp.lis 70, are both maintained manually. App.lis comprises a list of all the testcases in the suite which are completely trustworthy. I.e. those which have been fully verified in all environments and hence are "approved". Unapp.lis comprises a list of those testcases known to be rogue and thus awaiting repair. I.e. a list of "unapproved" or "disapproved" testcases. Unapp.lis includes a path to each testcase and comments regarding the problem with that case.

A further file, Untr.lis 100, resides within the operating system 15 but outside the testcase repository 50. This is also automatically generated by list program 110. Untr.lis comprises a list of those testcases which are neither approved nor unapproved. They are untried or not-tested. It comprises a path to each testcase and the comment "untried".

A DB2 database 75, comprising a plurality of records each with information regarding a system defect, also sits within the testcase repository. Each defect record comprises amongst other things:
i) A system defect identifier (ID)
ii) A comment detailing the defect (comm); and
iii) The status of the system defect (status)—This could be open, working, verify or closed (as explained in the introduction).

Each time a system defect is discovered, information regarding that defect is manually entered into the DB2 database 75.

The testcase repository also comprises an open/working list (o/w) 65. This is a flat text file containing the names of testcases associated with defects with a status of open or working. In the example, these are the testcases associated with defects "a" and "b". Note, each defect record in DB2 database 75 does not include an association with a testcase (or a plurality of testcases), since the ID and the name of the testcase which tests for that system defect are the same. For example, a defect with an identifier of "a" is associated with testcase "a.java".

The testcase repository 50 further comprises a plurality of "fixedinVersion n" lists (version lists) 85, 86, 87. These version lists are maintained manually and list the names of testcases which test for system defects only fixed in a particular version of the system. "n" (see above) denotes the version of the system in which a particular system defect was eradicated. Note, it is quite common to defer the fixing of a system defect until a future version of the system under test and the version lists provide a way of tracking this.

These version lists are also flat text files and include a path to each relevant testcase and a comment for each such as "only fixed in version 1". File 85 relates to system defects fixed in version 1 of the system under test, with file 86 denoting those system defects fixed in version 2 and file 87 referring to defects fixed in version 3.

Figure 2B:
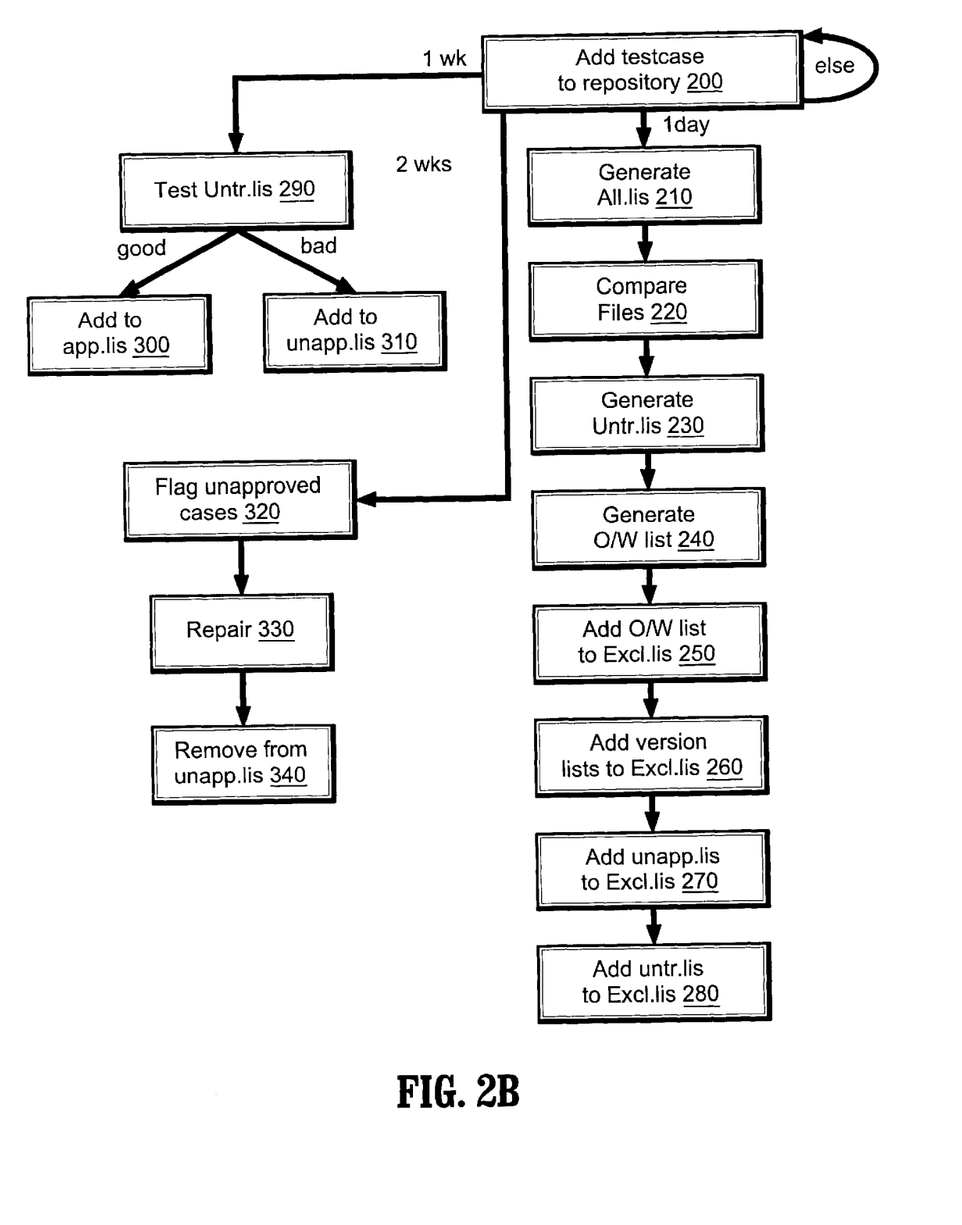
FIG. 2B illustrates the method of the present invention according to a preferred embodiment.

FIG. 2B illustrates the method of the present invention according to a preferred embodiment. It should be read in conjunction with FIG. 2A. As and when programmers write testcases, they are added to the testcase repository (step 200). At the end of every day the list program 110 of FIG. 2A is executed. The program scans the testcase repository and retrieves the names of all the testcases within it. This information is then used to generate the list of all the testcases contained within it, All.lis (step 210).

The list program then compares those testcases named in both App.lis 80 and Unapp.lis 70 with the list of all testcases contained in the repository, All.lis 90 (step 220). Those cases which are only mentioned in All.lis are assumed to be neither approved nor unapproved. They are therefore untried and could possibly be rogue. This information is used to generate Untr.lis (step 230).

The system defect information (75 of FIG. 2A) is examined by the list program to identify those defects which have a status of open or working. The paths of the associated testcases are copied from All.lis to the open/working (o/w) list at step 240. There is little point in testing for these defects since they have not yet been fixed in the system and hence will almost certainly cause the testcase(s) to fail. The cases listed on the o/w list are therefore added to the exclusion list at step 250.

Every time a system defect is fixed it is given a status of "verify" and then finally "closed". The next time the o/w list is generated the testcase relating to that defect will no longer appear on the list. Assuming that the testcase does not appear on another one of the lists to be added to the exclusion list, the next time the testcase suite is executed on the system under test, that testcase will be included in the test run.

According to the preferred embodiment, if testcases testing for defects with a status of verify or closed fail then that failure is investigated. As previously stated, it is common to defer the fixing of system defects to a particular version of the system under test. The verify/closed status does not necessarily reflect a system defect which has been fixed for all versions, only that it has been fixed. Thus work is required to discover whether a testcase failure is as a result of a system defect being fixed in a version later than that of the system under test. If this is found to be the case, then the associated testcase is added to the relevant "FixedinVersion n" list.

The list program is passed as a parameter the version of the system under test. This is input by the user according to the version they wish to test. In the present example, version 1 is under test. There is no sense therefore in running testcases testing for system defects which will only be fixed in later versions (ie versions 2 and 3) since these tests will fail. The list program scans the testcase repository for the version lists. It finds the "fixedinVersion 1" but ignores this since this is the version under test and there is no need to exclude the testcases listed by this file. Note, even though the defects have been fixed, it is still important to test for these fixed defects, since a problem may reoccur as a result of subsequent changes made to the system during the testing phase. Those files relating to versions later than version 1, ie files 86 and 87 are found and returned to the program. There is no point testing for a defect which has been fixed in a later version of the system than the one currently under test so they are both added to the exclusion list (step 260).

When a system defect has been fixed in, for example, version 1 of the system under test, this may be irrespective of operating system. Ie if the system under test runs on both Windows NT and AIX, then the defect will no longer be present in either the Windows NT version 1 or the AIX version 1.

Alternatively, the operating system is passed as a parameter to the list program 110 along with the version of the system under test. Each version list includes a reference to both the version and the operating system in which a particular system defect was fixed. If AIX version 1 is under test, then the list program will scan the testcase repository for all version lists with a later version number and for those with the same or smaller version number, but not including the string AIX. There is no point in testing for defects which were fixed in version 1 of the version of the system running under Windows NT for example. Note, alternatively there may just be one version list for each version of the system under test. The reference to any testcase relating to defects only fixed in that version for a particular operating system would include a comment to that effect. The list program would then use this comment to add to the appropriate testcases to the exclusion list. The list of unapproved testcases and untried test cases are also added to the exclusion list (steps 270, 280).

Thus, the final exclusion list includes unapproved and untried test cases. It further comprises testcases testing for system defects with a status of open or working, testcases testing for system defects which have not yet been fixed in the version of the system under test. It is possible for a testcase to be excluded for more than one reason. Appendix D shows an example final exclusion list. The list includes an overall heading explaining why a set of testcase are excluded (eg "Testcases for open or working defects"). It further includes a path to the testcase and a comment explaining why a particular testcase within the set is excluded (eg defect in open state). This information is transferred directly from the individual lists (ie unapp.lis, untr.lis etc).

Once a week the list of untried testcases is examined and the testcases that it lists tested in all environments (step 290). Any associated instructions are also inspected to ensure that they are accurate, adequate and understandable. Assuming that the testcase is good on both counts, it is added to the list of approved cases, App.lis (step 300). If not, an entry is made on the list of unapproved testcases, Unapp.lis (step 310).

According to the preferred embodiment, every two weeks testcase writers are informed if they have testcases on the unapproved list (step 320). Each testcase contains the name of the testcase developer and when a testcase is added to the unapproved list, this information is transferred along with it. In the preferred embodiment, the administrator examines the list and notifies the relevant person. In an alternative preferred embodiment the computer system 7 (FIG. 2A) further comprises a text file listing testcase writers and their electronic mail addresses. This is located within the operating system, but outside of the testcase repository. The list program identifies the testcase writers whose names appear on the unapproved list and looks up their email address in the text file. Testcase writers are thus automatically notified.

According to the preferred embodiment, once their testcase(s) have been repaired (step 330) they can then be removed from the unapproved list (step 340). The unapproved list may also contain information regarding the problem with the testcase, thus aiding the repair process.

Next time the list program is executed, it will determine that a repaired testcase exists in the All.lis file but not in the approved or unapproved list files. The testcase will therefore be included in the list of untried cases and thus the whole process is repeated.

Figure 3:
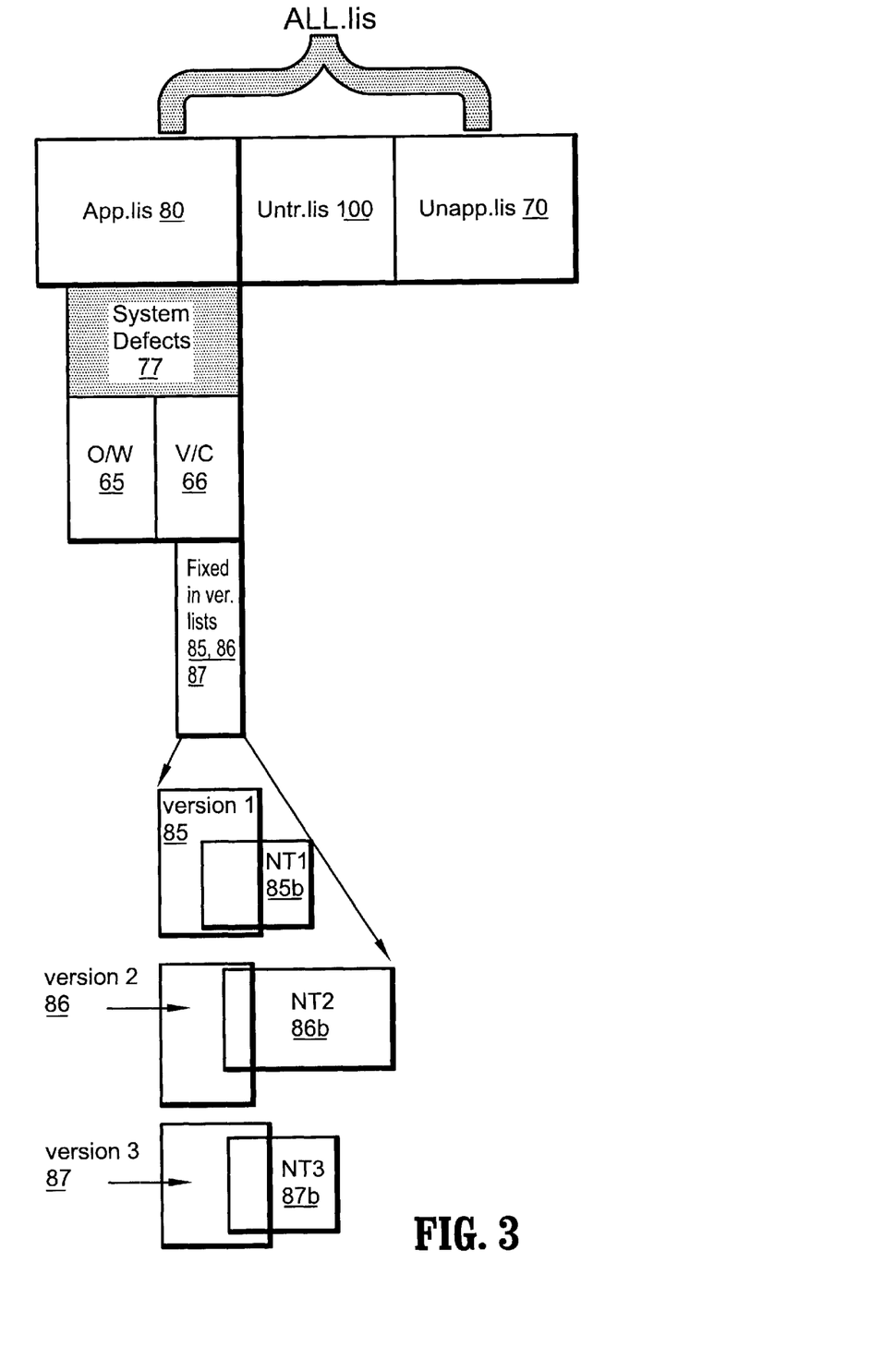
FIG. 3 shows the distribution of testcases amongst the flat files of FIG. 2A.

FIG. 3 is a block diagram illustrating the distribution of all the testcases contained within the testcase suite amongst the flat files of FIG. 2A. To re-iterate All.lis 90 comprises approved testcases (App.lis 80), untried testcases (Untr.lis 100) and unapproved testcases (Unapp.lis 70). Untr.lis comprises those testcases present on All.lis but not on either App.lis or Unapp.lis. Untr.lis and Unapp.lis both form part of the exclusion list and so their testcases do not get executed upon the system under test (30 of FIG. 1). The only testcases with the potential to be executed are those on the approved list. This however, is not guaranteed.

The testcases on the approved list may generate various system defects 77. Each defect is associated with at least one testcase. Some of the testcases may be associated with defects which have the status of open or working (o/w), in which case they will be listed on the o/w list 65. The o/w list forms part of the exclusion list, therefore despite a testcase being present on App.lis, it will be excluded since it relates to a defect which has not yet been fixed. The status of defects tested for by testcases on the untried and unapproved lists is irrelevant since these testcases are already excluded.

Defects which are not open or working have a status of verify or closed (v/c) 66. The majority of these system defects will have been fixed in all versions of the system under test. However, a sub-set will have only been fixed in a particular version of the system. As previously discussed, it is important not to test for defects which have been fixed in a later version of the system that the one currently under test, since these tests will fail. The plurality of fixedinVersion (version) lists 85, 86, 87 described in FIG. 2A are used to control this. To-reiterate, these fixedinVersion lists relate to testcases which test for system defects that have been fixed. Testcases corresponding to system defects which are to be fixed will appear on the o/w list since these defects will have a status of either open or working. File 85 relates to testcases testing for defects fixed in version 1 of the system under test, 86 for those fixed in version 2 and 87 for those fixed in version 3.

As first mentioned with regard to FIG. 2B, some defects may have been fixed in a particular version, irrespective of operating system. In the present example, testcases relating to defects fixed in version 1 will appear in file 85. However, some of the system defects fixed in version 1 will have only been fixed in the version 1 relating to a particular operating system. In the example given, some testcases have been fixed in version 1, but only in the Windows NT version 1. These are also added to a "fixedinVersion 1 Win NT" (NT1) flat file (85b). These testcases may therefore appear in both files 85 and 85b—there is overlapping scope. The same is true of versions 2 and 3. There is a "fixedinVersion 2 Win NT" (NT2 86b) flat file (86b) and a "fixedinVersion 3 Win NT" (NT3 87b).

Acknowledgements

Java is a trademark of Sun Microsystems Inc.
AIX is a trademark of the IBM Corporation
RISC System/6000 is a trademark of the IBM Corporation
DB2 is a trademark of the IBM Corporation
UNIX is a trademark of UNIX System Laboratories, Inc.
Windows NT is a trademark of the Microsoft Corporation
PVCS is a trademark of Intersolv, Inc.

Appendix A

```
* @test 1.1
* @bug 1033
* @author Trevor Boardman
* @summary Array test
public class d1033
{
    static String sSCCSid = "@(#)88 1.4
```

-continued

Appendix A

```
regular/1033/d1033.java, regression, regression 3/17/99 09:04:45";
    public static void rev( byte[] buf )
    {
        int i;
        byte b;
        for (i=0; i<buf.length/2; i++)
        {
            b = buf[buf.length-i-1];
            //                        X marks the spot
            buf[buf.length-i-1] = buf[i];
            buf[i] = b;
        }
    }
}
public static void main( String[] args
{
    byte[] t = new byte[4];
    t[0] = 1; t[1] = 2; t[2] = 3; t[3] = 4;
    String sStart, sEnd;
    sStart = "" + t[0] + ", " + t[1] + ", " + t[2] + ", " + t[3];
        System.out.println( "Starting with " + sStart);
        rev( t );
        sEnd = "" + t[0] + ", " + t[1] + ", " + t[2] + ", " + t[3];
        if( !sEnd.equals( "4, 3, 2, 1" ) ) throw new
RuntimeException( "FAILED array test" );
        System.out.println( "Ending with " + sEnd );
    }
}
```

Appendix B
JavaTest: Tests that passed
Execution successful regular/472/d472.java: - Symbol Font laid out as if non-proportionally spaced. regular/4287/d4287.java: 3 long params caused JIT crash
regular/1033/d1033.java: Array test
regular/4070/d4070.java: ArrayIndexOutOfBoundsException in CharToByte w/ JIT
regular/262/d262.java: Check Divide by Math.sqrt(3.0)
regular/457/d457.java: Check Division problems with MIN_INT operands
regular/306/d306.java: Check File.exists File.canRead File.canwrite
regular/7803/d7803.java: Check Italian Euro Monetry Format
regular/610/d610.java: Check JIT executes all code
regular/268/d268.java: Check JIT rounding
regular/6249/d6249.java: Check JPopupMenu - setVisible()
regular/3795/d3795.java: Check Math.abs
regular/3949/d3949.java: Check Maths 58
regular/7817/d7817.java: Check SimpleDateFormat seconds with duff input
regular/8893/d8893.java: Check for Error with Method overriding
regular/7867/d7867.java: Check for JIT bug in loop
regular/7488/d7488.java: Check for deadlock loading gif file
regular/2284/d2284.java: Check for recursion in deflater class
regular/7725/d7725.java: Check hang waiting for one millisecond to elapse
regular/6012/d6012.java: Check if PlainDatagramSocketImpl finalize() hangs
regular/6635/d6635.java: Check pattern matching
regular/779/d779.java: Check shift long feeding zeros right Appendix C
JavaTest: Tests that failed Execution failed: 'main threw exception:
java.lang.RuntimeException: Testcase failed: build date seems suspect
* regular/7810/d7819.java: java-full version should identify JIT level
Execution failed: 'main' threw exception:

-continued

Appendix C
JavaTest: Tests that failed java.lang.RuntimeException: inset functions returned different values
* regular/516/d516.java: Check that Frame.insets returns the same value, regardless of reshape being called Appendix D
Final Exclusion list:

```
#-------------------------------------------------------
# Testcases for open or working defects
#-------------------------------------------------------
./regular/8000/d8000.java defect in open state
./regular/5111/d5111.java defect in open state
./regular/5861/d5861.java defect in open state
./regular/6335/d6335.java defect in open state
./regular/4484/d4484.java defect in open state
./regular/5872/d5872.java defect in open state
./regular/5898/d5898.java defect in open state
./regular/6110/d6110.java defect in open state
./regular/5738/d5738.java defect in open state
./regular/6643/d6643.java defect in open state
#-------------------------------------------------------
--# Testcases for defects fixed in JDK 1.2 and later
#-------------------------------------------------------
regular/4236/d4236.java only fixed in 1.3 or maybe 1.2.2
regular/6409/d6409.java Sun bug open but Hursley defect closed
regular/5392/d5392.java only fixed in 1.2
#-------------------------------------------------------
--# Testcases that are disapproved
#-------------------------------------------------------
#           Ben's Tests
regular/187/d187.java Make sure LED applet runs without leaving LEDs lit
#Doesn't work. Throws a NullPointerException.
regular/9399/d9399.java URLConnection()
getContentLength() returns -1
# Throws an UnknownHostException
regular/321/d321.java needs work (see Bill)
#-------------------------------------------------------
--# Testcases that are untried
#-------------------------------------------------------
./regular/10737/d10737.java untried
./regular/10737/d10737_2.java untried
./regular/9112/d9112.java untried
./regular/10290/d10290.java untried
./regular/10238/d10238.java untried
```

What is claimed is:

1. In a testcase management system comprising a test suite including a plurality of testcases cooperable with a test harness for executing a test run in which at least one of said testcases is executed on a system to be tested, a method of generating a list indicative of the testcases that are to be executed, said method comprising the steps of:

generating a list of all testcases in said test suite;

providing a list of those testcases which are approved;

providing a list of those testcases which are disapproved;

generating a defect list of those testcases corresponding to defects in said system to be tested which have not been fixed;

generating a further list of testcases, indicative of the cases to be executed on said test run, said cases excluding:

cases from the disapproved list;

cases from the all testcases list which are neither in the approved nor disapproved lists; and cases from the defect list.

2. The method of claim 1, wherein said further list generating step generates an exclusion list comprising cases which are not to be tested.

3. The method of claim 2, wherein the exclusion list further comprises information as to why a particular testcase is excluded.

4. The method of claim 1, wherein said further list generating step generates a list comprising cases which are to be tested.

5. The method of claim 1, wherein said cases which are on neither the approved nor disapproved lists are not-tested, and wherein the method further comprises: generating a not-tested list of cases.

6. The method of claim 5, further comprising:

repairing a disapproved testcase;

removing said disapproved testcase from the disapproved list;

re-generating the not-tested list, wherein said not-tested list includes the repaired testcase.

7. The method of claim 5, further comprising:

periodically testing the cases on the not-tested list; and responsive to said cases executing successfully, adding the successful cases to the approved list.

8. The method claim 5, further comprising:

periodically testing the cases on the not-tested list; and responsive to said cases executing unsuccessfully, adding said unsuccessful cases to the disapproved list.

9. The method of claim 1, further comprising: providing at least one version list of testcases, an or each version list being associated with a respective version of the system to be tested and comprising a list of testcases corresponding to defects which have been corrected in said version of the system, wherein said further list generating step generates a list including cases from those version lists relating to versions later than the version of the system to be tested.

10. The method of claim 9 wherein the or each version list comprises testcases which correspond to defects which have been fixed in that version of the system to be tested irrespective of operating system.

11. The method of claim 9, wherein the or each version list is associated with a version and an operating system on which said system to be tested is associated.

12. The method of claim 11, wherein the further list generating step generates a list including cases from those version lists relating to versions both equal to or earlier than the version of the system to be tested, and corresponding to an operating system other than that which the version of the system to be tested runs.

13. The method of claim 1, wherein one or all of the lists comprise a text file of testcase identifiers and wherein each testcase identifier is a path name to each of said testcases.

14. The method of claim 13, wherein each testcase identifier is associated with a testcase writer identifier.

15. The method of claim 14 further comprising informing a testcase writer that one of their testcases is disapproved.

16. The method of claim 15, wherein said testcase writer is informed via electronic mail.

17. The method of claim 1, wherein the disapproved list of cases further comprises information relating to why each case is disapproved.

18. The method of claim 1, wherein a testcase may be excluded for more than one reason.

19. An apparatus cooperable with a testcase management system comprising a test suite including a plurality of testcases, said apparatus being adapted to generate a list indicative of testcases that are to be executed under the control of a test harness in a test run in which one or more of said test cases is executed on a system to be tested, said apparatus comprising:

means for generating a list of all testcases in said test suite, wherein said testcases are either approved, disapproved or not-tested;

means for generating a defect list of those testcases corresponding to defects in said system to be tested which have not been fixed;

means for generating a further list of testcases, indicative of the cases to be executed on said test run, said cases excluding:

cases which are disapproved;

cases which are not-tested; and cases from the defect list.

20. A computer program product comprising computer program code stored on a computer readable storage medium, the program code comprising an apparatus for, when executed on a computer, cooperable with a testcase management system comprising a test suite including a plurality of testcases, said computer program product adapted to generate a list indicative of the testcases that are to be executed under the control of a test harness in a test run in which one or more of said testcases is executed on a system to be tested, said computer program product comprising:

program code for generating a list of all testcases in said test suite, wherein said testcases are either approved, disapproved or not-tested;

program code for generating a defect list of those testcases corresponding to defects in said system to be tested which have not been fixed;

program code for generating a further list of testcases, indicative of the cases to be executed on said test run, said cases excluding:

cases which are disapproved;

cases which are not-tested; and cases from the defect list.

* * * * *